United States Patent
Schmidt (10) Patent No.: US 10,457,383 B2
(45) Date of Patent: Oct. 29, 2019

(54) AIRCRAFT LANDING GEAR ASSEMBLY

(71) Applicant: Safran Landing Systems UK Limited, Gloucester (GB)

(72) Inventor: Robert Kyle Schmidt, Gloucester (GB)

(73) Assignee: Safran Landing Systems UK LTD (GB)

( * ) Notice: Subject to any disclaimer, the term of this patent is extended or adjusted under 35 U.S.C. 154(b) by 412 days.

(21) Appl. No.: 15/407,001

(22) Filed: Jan. 16, 2017

(65) Prior Publication Data

US 2017/0203833 A1   Jul. 20, 2017

(30) Foreign Application Priority Data

Jan. 19, 2016 (EP) .................................. 16151978

(51) Int. Cl.
| | |
|---|---|
| *B64C 25/10* | (2006.01) |
| *B64C 25/34* | (2006.01) |
| *B64C 25/58* | (2006.01) |
| *B64C 25/26* | (2006.01) |

(52) U.S. Cl.
CPC .............. *B64C 25/10* (2013.01); *B64C 25/26* (2013.01); *B64C 25/34* (2013.01); *B64C 25/58* (2013.01)

(58) Field of Classification Search
CPC ......... B64C 25/02; B64C 25/10; B64C 25/18; B64C 25/20; B64C 25/26; B64C 25/34; B64C 25/58
See application file for complete search history.

(56) References Cited

U.S. PATENT DOCUMENTS

| | | | |
|---|---|---|---|
| 2,422,576 A | 6/1947 | Martin | |
| 2,487,329 A | 11/1949 | Gerry | |
| 2,692,739 A | 10/1954 | Martin | |
| 2007/0194172 A1 | 8/2007 | Luce | |
| 2012/0132742 A1 | 5/2012 | O'Connell | |
| 2013/0299631 A1* | 11/2013 | Tucker | B64C 25/26 244/102 R |
| 2016/0347444 A1* | 12/2016 | Vatovec | B64C 25/20 |

FOREIGN PATENT DOCUMENTS

| | | |
|---|---|---|
| FR | 832767 | 10/1938 |
| GB | 447610 | 5/1936 |
| GB | 526947 | 9/1940 |
| GB | 543341 | 2/1942 |
| GB | 558751 | 1/1944 |
| GB | 626280 | 7/1949 |
| GB | 648362 | 1/1951 |
| GB | 674237 | 6/1952 |
| GB | 1175097 | 12/1969 |
| GB | 2507823 | 5/2014 |
| RU | 2415777 | 4/2011 |
| WO | 2014170636 | 10/2014 |

OTHER PUBLICATIONS

European Search Report for European Application No. 16151978. 0-1754, dated Jul. 19, 2016, 5 pages.

* cited by examiner

*Primary Examiner* — Benjamin P Lee
(74) *Attorney, Agent, or Firm* — RatnerPrestia (57) ABSTRACT

An aircraft landing gear assembly includes a structural member coupled to another part by a joint including engagement formations or a relatively high friction coating arranged such that the joint inhibits pivotal movement of the structural member when the structural member is compressively loaded in an axial manner.

20 Claims, 5 Drawing Sheets

AIRCRAFT LANDING GEAR ASSEMBLY

This application claims the benefit of and priority to European Application No. EP16151978.0, filed on Jan. 19, 2016, the contents of which are incorporated herein by reference.

BACKGROUND TO THE INVENTION

An aircraft landing gear assembly can include a structural member arranged to control the orientation of one or more other parts of the assembly by reacting compressive or tensile loads applied to the structural member as a result of attempted movement of the other parts of the assembly.

One example of such a structural member is a stay, which controls the orientation of the main strut when the landing gear assembly is in a deployed condition.

A stay can comprise a two bar linkage that can be unfolded to assume an aligned condition in which the stay axially reacts attempted movement of the main strut from the deployed condition. A lateral load applied to the stay can "break" it, i.e. move it out of the aligned condition, such that axial loading causes the stay to fold as the main strut is moved by a retraction actuator to a stowed condition.

Another example of a structural member is a lock stay or lock link, which controls the orientation of the stay to maintain the stay in the locked condition and applies a lateral load to break the lock link. A lock link typically comprises a two bar linkage that can be unfolded to assume a locked over-center condition to inhibit movement of the stay.

The load that can be reacted by a structural member in tension is significantly higher than the load that can be taken in compression. Thus, structural members designed to handle compressive loads are generally of a relatively large cross sectional size in comparison to tensile members so as to reduce the likelihood of the structural member buckling when loaded.

The present inventor has identified that structural members arranged to control the orientation of one or more other parts of a landing gear assembly by reacting compressive loads applied to the structural member as a result of attempted movement of the other parts of the assembly can be made smaller and lighter than known structural members.

SUMMARY OF INVENTION

Embodiments of the invention relate to an aircraft landing gear assembly that includes a structural member coupled to another part of the assembly by a joint which includes engagement formations or a relatively high friction coating arranged such that friction in the joint is increased to inhibit pivotal movement of the structural member when the structural member is compressively loaded in an axial manner. The engagement formations and high friction coating(s) therefore provide alternative solutions to the technical problem of reducing the likelihood of buckling.

According to a first aspect of the invention there is provided an aircraft landing gear assembly having:

a first part and a second part, the first and second parts being movably mounted with respect to one another;

a structural member pivotally coupled to the first part via a first joint, the structural member having a load reacting condition in which it inhibits relative movement between the first and second parts by reacting a compressive load applied to it by the parts, the first joint including a first bearing surface associated with the first part and a second bearing surface associated with the structural member, the joint being arranged such that the first bearing surface mechanically couples with the second bearing surface during said compressive loading so as to define a load path between the first and second bearing surfaces by each bearing surface engaging a respective bearing counter-face; and one or more springs, wherein the first and second bearing surfaces each define male and/or female engagement formations arranged to engage with the respective first and second counter-faces to inhibit pivotal movement of the structural member relative to the first part when the first and second bearing surfaces are engaged in an interlocking condition with the respective first and second counter-faces, the one or more springs being arranged to urge the first and second bearing surfaces to assume a spaced condition in which they are relatively spaced from the respective first and second counter-faces so as to permit said pivotal movement of the structural member relative to the first part.

Thus, in the absence of a compressive force above a predefined magnitude, the biasing members hold the engagement formations apart such that the structural member can pivot relative to the first part in a relatively unobstructed manner. The biasing members define smooth, circular bearing surfaces which run against smooth bearing surface portions of the parts that they separate. When the first and/or second part attempts to move so as to apply a compressive force to the structural member, the force elastically deforms the biasing member(s) so as to force the bearing surfaces to assume the interlocking condition; in this condition, the formations inhibit pivotal movement of the structural member, which can reduce the likelihood of the structural member bucking. The first bearing surface can mechanically couple with the second bearing surface directly during said compressive loading, or can do so via one or more other parts, such as a pivot pin.

The structural member can be pivotally coupled to the second part via a second joint. The second joint can include a third bearing surface associated with the second part and a fourth bearing surface associated with the structural member, the second joint being arranged such that the third bearing surface mechanically couples with the fourth bearing surface during said compressive loading by each engaging with a bearing counter-face. The third and fourth bearing surfaces each define male and/or female engagement formations arranged engage with the respective third and fourth counter-faces to inhibit pivotal movement of the structural member relative to the second part when the third and fourth bearing surfaces are engaged in an interlocking condition with the respective third and fourth counter-faces. The assembly further includes one or more resilient biasing members arranged to urge the third and fourth bearing surfaces to assume a spaced condition in which they are relatively spaced from the respective third and fourth counter-faces so as to permit said pivotal movement of the structural member relative to the second part. Thus, the ends of the structural member can be arranged to positively engage the first and second parts, respectively, when axially loaded.

The structural member can comprise a two bar linkage pivotally coupled at a central region between its ends by a third joint, the third joint including a fifth bearing surface associated with a first bar of the structural member and a sixth bearing surface associated with a second bar of the structural member. The third joint is arranged such that the fifth bearing surface mechanically couples with the sixth bearing surface during said compressive loading by each engaging with a bearing counter-face. The fifth and sixth bearing surfaces each define male and/or female engagement formations arranged to engage with the respective fifth and sixth counter-faces to inhibit pivotal movement of the first bar of the structural member relative to the second bar of the structural when the fifth and sixth bearing surfaces are engaged in an interlocking condition with the respective fifth and sixth counter-faces. The assembly further includes one or more resilient biasing members arranged to urge the fifth and sixth bearing surfaces to assume a spaced condition in which they are relatively spaced from the respective fifth and sixth counter-faces so as to permit said pivotal movement of the first bar of the structural member relative to the second bar of the structural member.

The engagement formations of the bearing surfaces and the counter-faces can be provided at just the regions which engage during compressive loading of the structural member. This can simplify the joints.

According to a second aspect of the invention there is provided an aircraft landing gear assembly including:

a first part and a second part, the first and second parts being movably mounted with respect to one another; and a structural member pivotally coupled to the first part via a first joint, the structural member having a load reacting condition in which it inhibits relative movement between the first and second parts by reacting a compressive load applied to it by the parts, the first joint including a first bearing surface associated with the first part and a second bearing surface associated with the structural member, the joint being arranged such that the first bearing surface mechanically couples with the second bearing surface during said compressive loading so as to define a load path between the first and second bearing surfaces by each bearing surface engaging a respective bearing counter-face, wherein at least one of the first bearing surface and the first counter-face and at least one of the second bearing surface and the second counter-face is defined by a layer of first material having a coefficient of friction which is relatively high in comparison to that of a second material from which at least one of the structural member, the first part and the second part is formed.

Thus, in the absence of a compressive force applied to the structural member, the level of friction between the bearing surfaces and the counter-faces is such that the structural member can pivot relative to the first part in a relatively unobstructed manner. When the first and/or second part attempts to move so as to apply a compressive force to the structural member, the force significantly increases the level of friction between the bearing surfaces and counter-faces due to the presence of the relatively high coefficient of friction layer; in this condition, the high level of friction inhibits pivotal movement of the structural member, which can reduce the likelihood of the structural member bucking.

The layers of first, third (see below) and fourth (see below) materials can each be arranged to define a bearing surface or counter-face having a coefficient of friction that is at least 0.4, preferably at least 0.8 and even more preferably at least 1. A typical chrome-bronze landing gear bearing can have a coefficient of friction that is approximately 0.3. A ceramic layer as described herein can have a coefficient of friction that is approximately 1.

The structural member can be pivotally coupled to the second part via a second joint. The second joint can include a third bearing surface associated with the second part and a fourth bearing surface associated with the structural member the second joint being arranged such that the third bearing surface mechanically couples with the fourth bearing surface during said compressive loading by each engaging with a bearing counter-face. At least one of the third bearing surface and the third counter-face and at least one of the fourth bearing surface and the fourth counter-face is defined by a layer of third material having a coefficient of friction which is relatively high in comparison to that of the second material from which at least one of the structural member, the first part and the second part is formed. The third material can be the same as the first material.

Thus, the ends of the structural member can be arranged to positively engage the first and second parts, respectively, when axially loaded.

The structural member can comprise a two bar linkage pivotally coupled at a central region between its ends by a third joint, the third joint including a fifth bearing surface associated with a first bar of the structural member and a sixth bearing surface associated with a second bar of the structural member, the third joint being arranged such that the fifth bearing surface mechanically couples with the sixth bearing surface during said compressive loading by each engaging with a bearing counter-face. At least one of the fifth bearing surface and the fifth counter-face and at least one of the sixth bearing surface and the sixth counter-face is defined by a layer of fourth material having a coefficient of friction which is relatively high in comparison to that of the second material from which at least one of the structural member, the first part and the second part is formed. The fourth material can be the same as the first material.

One or more, and in some cases all, of the high coefficient of friction layers can be a coating applied to the part in question.

One or more, and in some cases all, of the high coefficient of friction layers can each be defined on a bush which defines one of the bearing surfaces.

One or more springs can be provided, the one or more springs being arranged to urge the first and second bearing surfaces to assume a spaced condition in which they are relatively spaced from the respective first and second counter-faces so as to enable relatively unrestricted pivotal movement of the structural member relative to the first part in comparison when the first bearing surface mechanically couples with the second bearing surface during said compressive loading.

Any reference to coefficient of friction can mean coefficient of static friction.

The following features are common to all embodiments.

Each spring can be a generally annular, radially compliant spring disposed between a pair of smooth race surfaces, each race surface being arranged in parallel with a respective bearing surface or counter-face and at least one race within each pair being recessed with respect to the respective bearing surface or counter-face it such that a gap exists to house the deformed spring when the bearing surfaces engage the counter-faces.

The biasing member can comprise a radially compliant ring, such as a Belleville washer or a polymer ring.

The first bearing surface can be defined by an inner generally cylindrical face of a hole formed through each of one or more parallel first lugs associated with the first part. The second bearing surface can be defined by an inner generally cylindrical face of a hole formed through each of one or more parallel second lugs associated with the structural member. The first and second counter-faces can be defined by a pivot pin mounted within the coaxial holes defined by the first and second lugs.

Alternatively, the first and second bearing surfaces can directly face one another such that each acts as the counter-face for the other; for example, the first bearing surface can be defined by an inner generally cylindrical face of a hole formed through each of one or more parallel first lugs associated with the first part and the second bearing surface can be defined by a pivot pin mounted within the coaxial holes defined by the first lug and being rigidly coupled to the structural member.

The third bearing surface can be defined by an inner generally cylindrical face of a hole formed through each of one or more parallel third lugs associated with the second part. The fourth bearing surface can be defined by an inner generally cylindrical face of a hole formed through each of one or more parallel fourth lugs associated with the structural member. The third and fourth counter-faces can be defined by a pivot pin mounted within the coaxial holes defined by the third and fourth lugs.

Alternatively, the third and fourth bearing surfaces can directly face one another such that each acts as the counter-face for the other; for example, the third bearing surface can be defined by an inner generally cylindrical face of a hole formed through each of one or more parallel third lugs associated with the second part and the fourth bearing surface can be defined by a pivot pin mounted within the coaxial holes defined by the second lug and being rigidly coupled to the structural member.

The fifth bearing surface can be defined by an inner generally cylindrical face of a hole formed through each of one or more parallel fifth lugs associated with the first bar of the structural member. The sixth bearing surface can be defined by an inner generally cylindrical face of a hole formed through each of one or more parallel sixth lugs associated with the second bar of the structural member. The fifth and sixth counter-faces can be defined by a third pivot pin mounted within the coaxial holes defined by the fifth and sixth lugs.

Alternatively, the fifth and sixth bearing surfaces can directly face one another such that each acts as the counter-face for the other; for example, the fifth bearing surface can be defined by an inner generally cylindrical face of a hole formed through each of one or more parallel fifth lugs associated with the first bar and the sixth bearing surface can be defined by a pivot pin mounted within the coaxial holes defined by the sixth lug and being rigidly coupled to the second bar of the structural member.

The first part can comprise a main strut, such as a shock strut, arranged to be pivotally coupled to the airframe of an aircraft at its upper end and arranged to carry a ground contacting assembly such as a wheel assembly at its lower end. The second part can comprise the airframe of an aircraft. The structural member can comprise a stay.

Alternatively, the first part can comprise a main strut, such as a shock strut, arranged to be pivotally coupled to the airframe of an aircraft at its upper end and arranged to carry a ground contacting assembly such as a wheel assembly at its lower end. The second part can comprise a stay. The structural member can comprise a lock stay or lock link.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
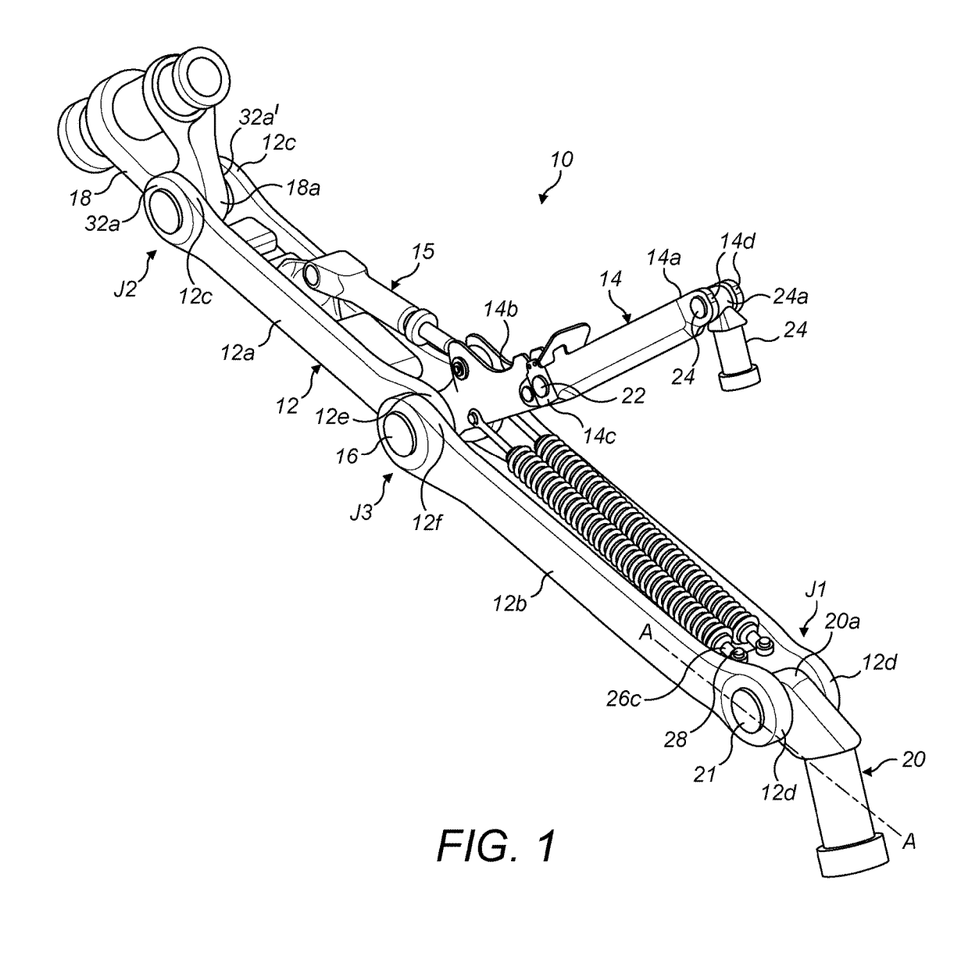
FIG. 1 is a diagram of a landing gear assembly according to an embodiment of the invention.

Referring first to FIG. 1, part of an aircraft, namely an aircraft landing gear assembly is shown generally at 10. The landing gear assembly 10 includes a two bar rolling, folding stay 12 and a two bar lock link 14. For clarity, parts such as the main strut and airframe are not shown.

The stay 12 is arranged to be moved between a folded condition, in which the landing gear assembly 10 is stowed for flight, and a generally straight or aligned condition, in which the landing gear assembly 10 is deployed for take-off and landing.

The stay 12 has an elongate upper stay arm 12a having a lower end defining a pair of lugs 12e pivotally coupled via a pivot pin 16 to a pair of lugs 12f defined at an upper end of an elongate lower stay arm 12b. The stay arms 12a, 12b may therefore pivotally move relative to one another about the pivot pin 16.

The upper end of the upper stay arm 12a defines a pair of lugs 12c that are pivotally coupled to a lug 18a of a connector 18 by a pivot pin, the connector 18 in turn being pivotally coupled to the airframe (not shown).

The lower end of the lower stay arm 12b defines a pair of lugs 12d that are pivotally coupled via a pivot pin 21 to a lug 20a of a connector 20, which in turn is pivotally coupled to the main strut (not shown).

The lock link 14 has an elongate upper link arm 14a having a lower end defining a pair of lugs 14c that are pivotally coupled to one or more lugs (not visible in FIG. 1) defined at an upper end of an elongate lower link arm 14b via a pivot pin 22. The link arms 14a, 14b may therefore pivotally move relative to one another about the pivot pin 22.

An upper end of the upper link arm 14a defines a pair of lugs 14d that are pivotally coupled via a pivot pin 24 to a lug 24a of a connector 24, which in turn is pivotally coupled to the main strut (not shown).

A lower end of the lower link arm 14b defines a lug (not visible in FIG. 1) that is pivotally coupled to the lugs 12e, 12f of the stay arms 12a, 12b via the pivot pin 16. Lugs of the upper stay arm 12a are disposed between the lugs of the lower stay arm 12b and the lugs of the lower link arm 14b.

A lock stay actuator (not shown) can be coupled between the upper stay arm 12a and lower link arm 14b and arranged to pivotally move the link arms 14a, 14b to 'unlock' the lock link 14.

As will be appreciated, when the lock link 14 is in the locked condition, as illustrated in FIG. 1, the upper and lower link arms 14a, 14b are generally longitudinally aligned or coaxial, and can be "over-center", such that the lock link 14 is arranged to oppose a force attempting to fold the stay 12, so as to move the landing gear assembly from the deployed condition towards the stowed condition.

When in the unlocked condition, the link arms 14a, 14b and stay arms 12a, 12b are not aligned, meaning that folding of the stay 12 results in folding the lock link 14. Thus, when in the unlocked condition, a retraction actuator (not shown) coupled between to the main strut and the airframe can move the landing gear assembly 10 between the deployed and stowed conditions.

The stay 12 and lock link 14 are therefore both structural members arranged to control the orientation of one or more other parts of the assembly by reacting compressive loads applied to the structural member as a result of attempted movement of the other parts of the assembly. When aligned, each has a load reacting condition in which it inhibits movement to the main strut towards the stowed condition by reacting a compressive load applied to it.

The load that can be reacted by a structural member such as the stay 12 in tension is significantly higher than the load that can be taken by it in compression. This is at least partly due to buckling. Euler's column formula provides the generally accepted method for determining the critical buckling load (Pcr) above which a structural member will buckle, where n is a factor accounting for the end conditions, E is the modulus of elasticity of the material, I is the moment of inertia of the cross section of the strut, and L is the length of the strut.

Euler's column formula:

$$Pcr = \frac{n\pi^2 EI}{L^2}$$

Figure 2:
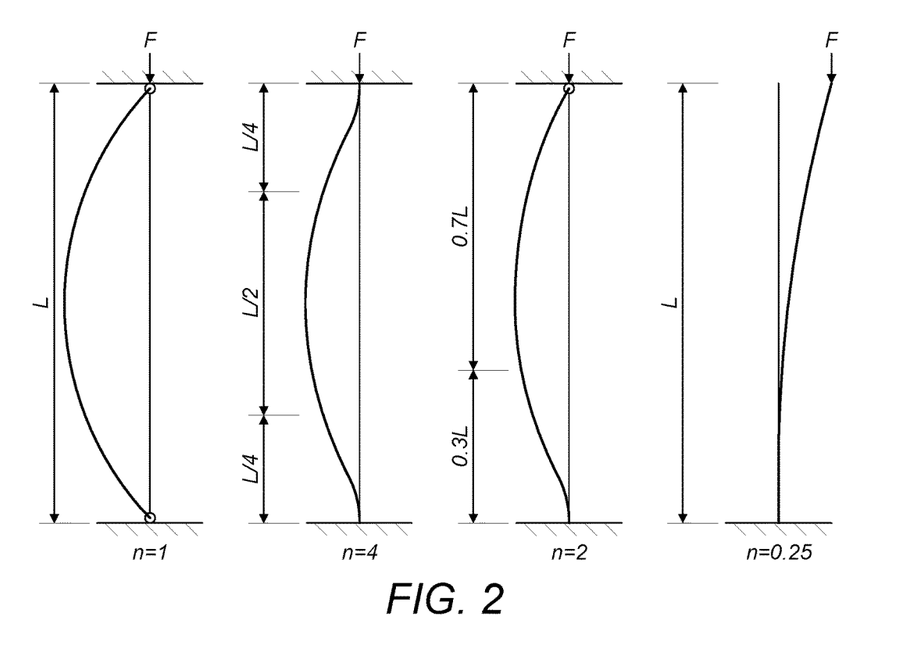
FIG. 2 illustrates a structural member under compression for varying end condition factors.

The end condition factor, n, is generally given by the diagram of FIG. 2. It can be seen from the formula and the end conditions illustrated in FIG. 2 that the end condition plays a significant role. The degrees of freedom in a landing gear structural member such as a stay, lock stay or brake rod tend to drive it to an end condition of n=1. The present inventor has realized that a more restrained end condition will have a significant effect improving the buckling capability of a landing gear assembly structural member with compliant end joints.

Figure 3:
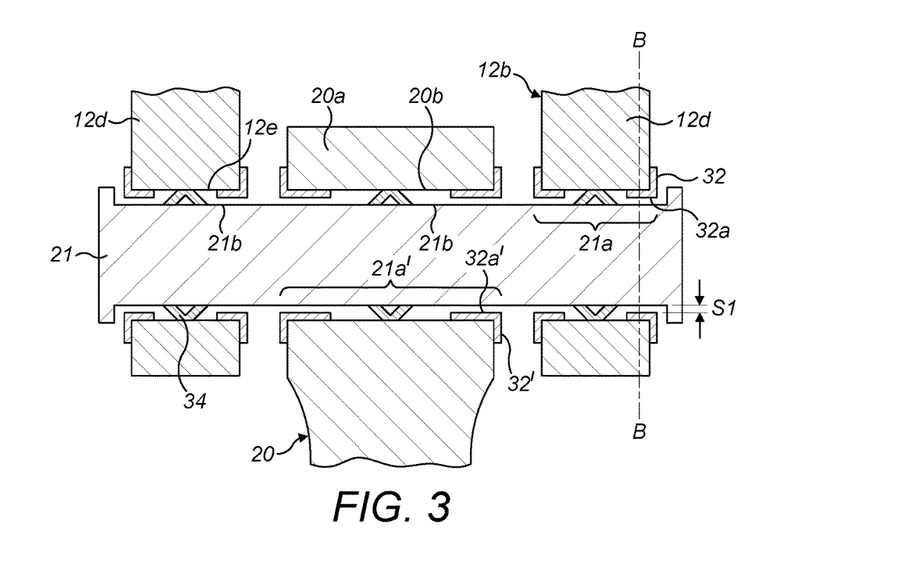
FIG. 3 is a diagram in cross section through A-A of a joint of the landing gear assembly of FIG. 1 showing the joint in an unloaded condition.
Figure 4:
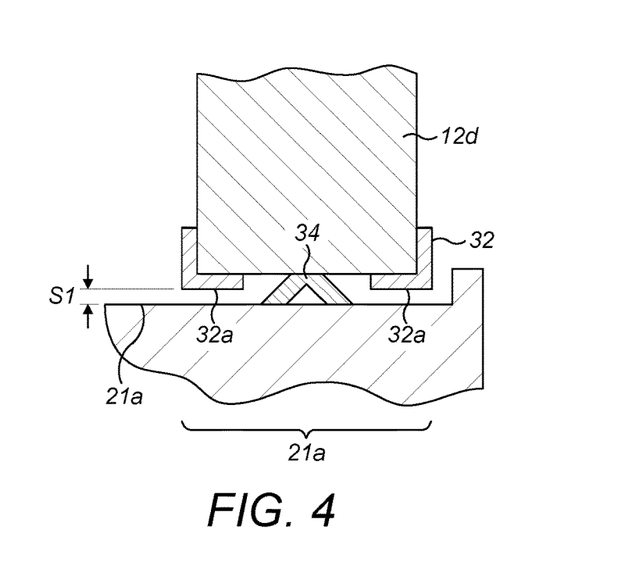
FIG. 4 is a diagram of part of the joint of FIG. 3.
Figure 5:
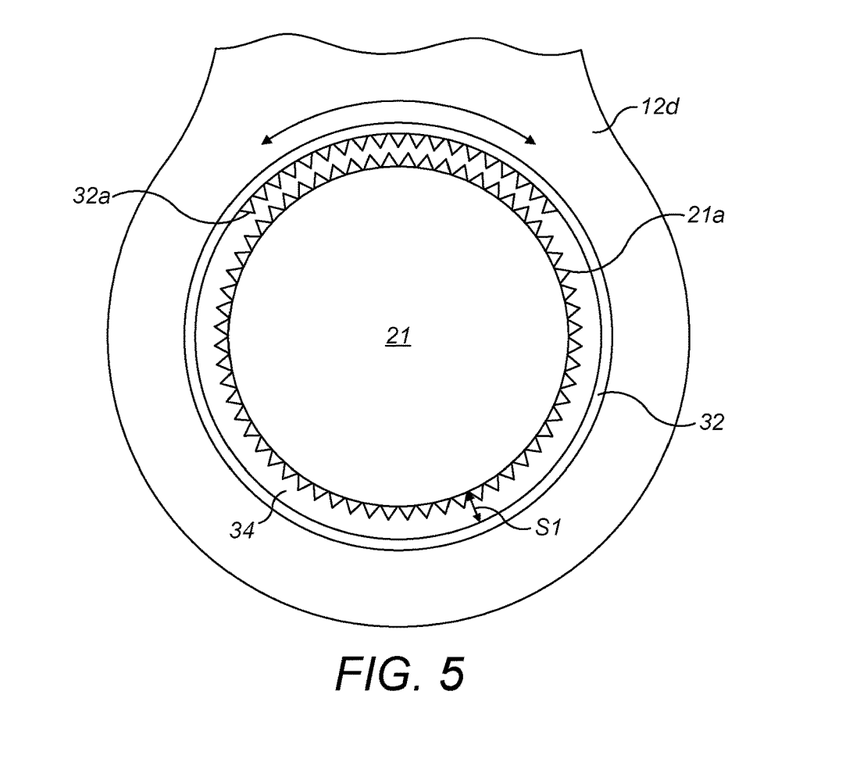
FIG. 5 is a diagram in cross section through B-B of the joint of FIG. 3.

Referring additionally to FIGS. 3 to 5, the joint J1 between the lower end of the lower stay arm 12b and connectors 20 is shown in cross section through A-A illustrated in FIG. 1. The structural member, which in this case is the stay 12, is in an unloaded condition. As will be appreciated, the assembly of FIG. 1 includes further joints J2 and J3.

Each of the lugs 12d, 20a has a hole extending laterally through it. In the illustrated embodiment, cylindrical flanged bushes 32 are fitted within each hole through the stay lugs 12d to define bearing surfaces 32a. Cylindrical flanged bushes 32' are fitted within the hole through the connector lug 20a to define bearing surfaces 32a'. The bushes 32, 32' can be fitted by way of an interference fit or retained by a mechanical fixing. However, bushes can be omitted, in which case the cylindrical inner faces of the lug holes can define the bearing surfaces.

Each bearing surface 32a, 32a' faces a region of the pin 21 which defines a respective counter-face 21a, 21a'. Each bearing surface 32a, 32a' can be moved into engagement with a respective counter-face 21a, 21a' when the stay 12 is compressively loaded by the main strut. The bearing surfaces 32a, 32a' and counter-faces 21a, 21a' are held apart from one another in a separated condition such that a gap S1 exists between them by radially compliant ring-shaped springs 34, such as Belleville washers. As best illustrated in FIG. 4, the springs 34 define smooth, circular bearing surfaces which run against smooth race portions 12e, 20b, 21b of the parts that they separate, which in this embodiment are the pin 21 on the one hand and the stay lugs 12d and the connector lug 20a on the other hand. Thus, in the absence of a compressive force above a predefined magnitude, the springs 34 hold the engagement formations 21a, 32a apart such that the stay arm 12b can pivot relative to the first part (main strut) in a relatively unobstructed manner.

As best illustrated in FIG. 5, which shows the one of the stay lugs 16b and pin 21 through section B-B illustrated in FIG. 3, the bearing surface 32 defines a plurality of projections extending around an arc BA, which corresponds to the surface area that contacts the pin counter-face 21a upon compressive loading of the stay 12. The counter-face 21a is provided with conforming projections such that the bearing surface and counter-face together define engagement formations that can inhibit relative rotation between the pin 21 and lug 12a. Each bearing surface 32a and counter-face 21a has the same or a similar arrangement.

Figure 6:
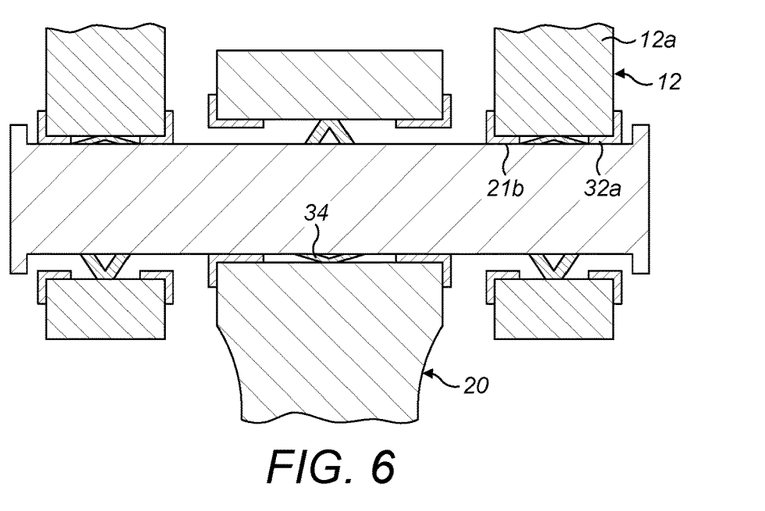
FIG. 6 is a diagram in cross section through A-A of the joint of FIG. 3 showing the joint in a loaded condition.
Figure 7:
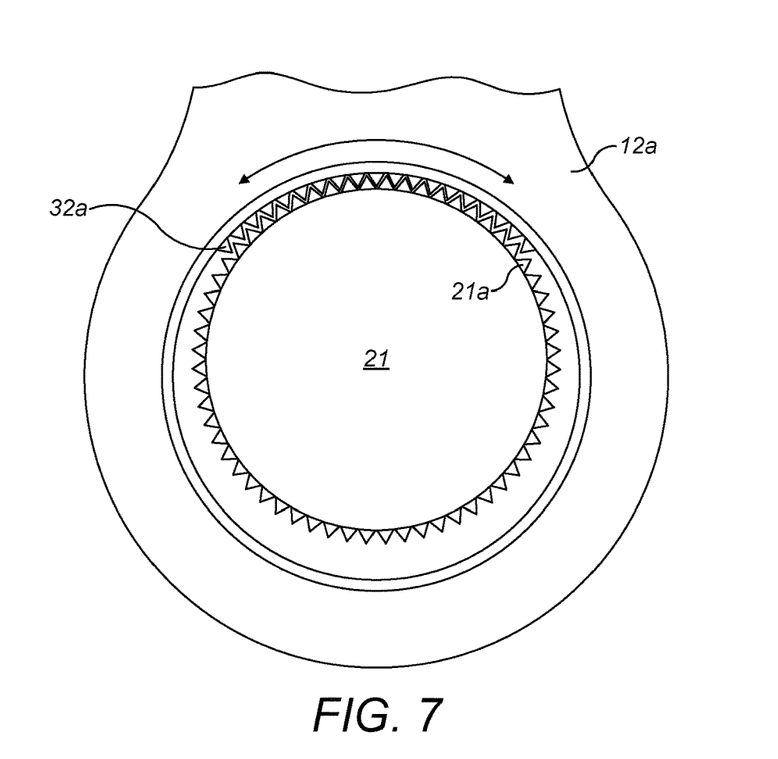
FIG. 7 is a diagram in cross section through B-B of the joint of FIG. 3 in the loaded condition.

Referring additionally to FIGS. 6 and 7, axial compressive loading of the stay 12 forces the bearing surfaces 32a into engagement with the counter-faces 21a against the bias of the springs 34. In this condition, the engagement formations inhibit pivotal movement of the structural member 12a relative to the main strut, thereby reducing the likelihood of the stay arm 12a buckling when the stay 12 is compressively loaded in an axial manner. The stay arm end condition is changed from a condition which is similar to n=1 in FIG. 2 to a condition which is closer to n=4.

Embodiments of the invention can be provided with any suitable engagement formations arranged to inhibit pivotal movement.

In alternative embodiments the bearing surfaces can directly face one another such that each acts as the counter-face for the other; for example, the one bearing surface can be defined by an inner generally cylindrical face of a hole formed through a lug associated with the structural member and the other bearing surface can be defined by a pivot pin mounted within the lug hole, the pin being rigidly coupled to either a second linkage of the structural member, or one of the first or second landing gear parts.

Figure 8:
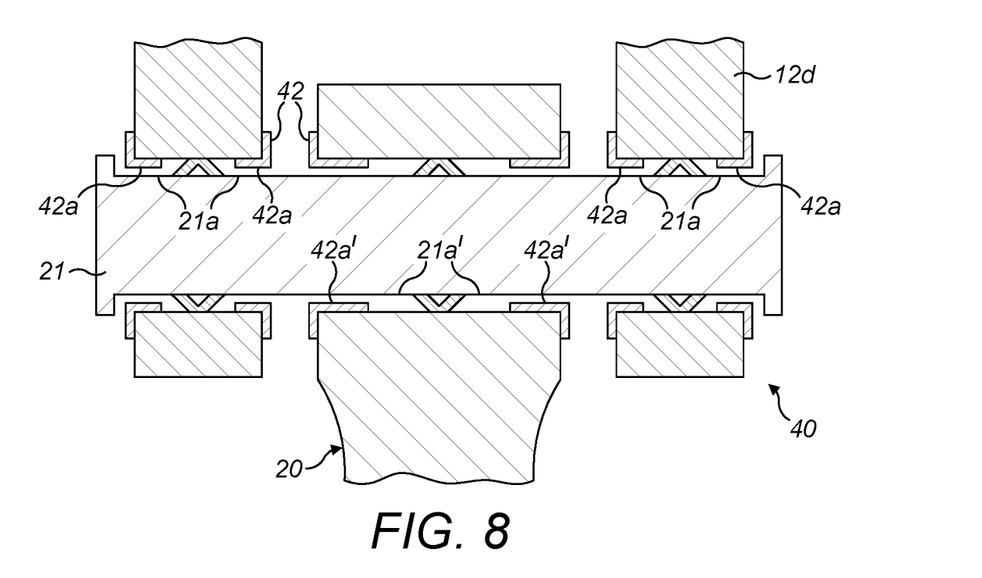
FIG. 8 is a diagram in cross section through A-A of a joint of a landing gear assembly according to a further embodiment showing the joint in an unloaded condition.
Figure 9:
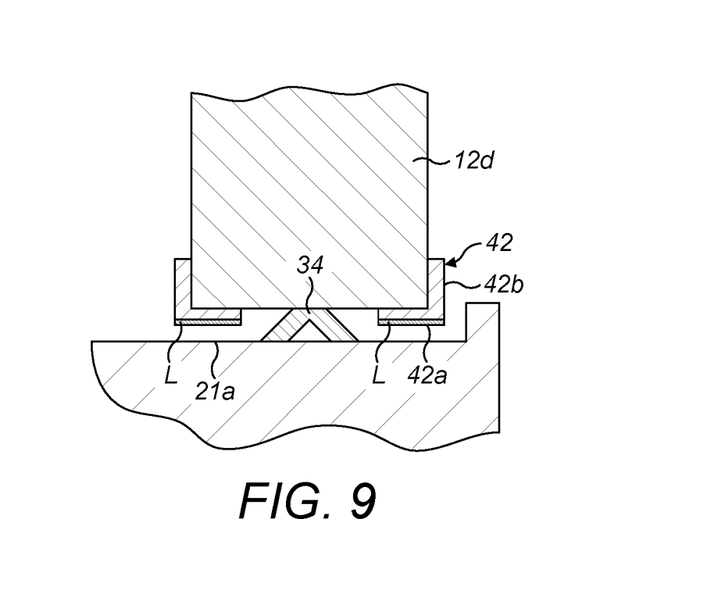
FIG. 9 is a diagram of part of the joint of FIG. 8.

Referring now to FIGS. 8 and 9, an alternative embodiment is shown in which an aircraft landing gear assembly 40 has an identical construction to the landing gear assembly 10 of FIG. 1 except that, rather than defining engagement formations, at least one of the first bearing surface 42a and the first counter-face 21a and at least one of the second bearing surface 42a' and the second counter-face 21a' is defined by a layer or coating L of first material having a coefficient of friction which is relatively high in comparison to that of a second material from which at least one of the structural member, the first part and the second part is formed.

The coatings L can each comprise a trans-ceramic coating, such as Lunac 2+ coating developed by the WMV laboratories. Coatings such as these can be very hard and long wearing, but have very high (near 1.0) coefficients of friction when used against an appropriate metallic pin material, or themselves.

The pin 21 can be a conventional metallic pin with chrome or WC—Co—Cr coating, or replaced with an appropriate hard, high coefficient of friction coating.

In some embodiments the coatings L can be provided on the bearing surfaces and counter-faces, just on the counter-faces or a mix of both.

While springs 34 are shown, in other embodiments they can be omitted and the parts arranged such that the bearing surfaces constantly run against the counter-faces. While one or both of the faces in each pair is defined by a layer of first material having a coefficient of friction which is relatively high, the level of friction under low load when the assembly is articulating does not inhibit movement.

Thus, embodiments of the invention can include joints such as pin and bush joints which utilize high coefficient of friction, hard wearing coatings. As landing gear side stays only need to articulate when they are not loaded, a high coefficient of friction joint will not be significantly adverse to the functioning of the landing gear. However, side stays are highly loaded when they are not moving, and when buckling resistance is required. A high friction joint under significant load will act not as a pin joint, but as a restrained end condition, increasing the value, n from 1 to near 4.

While the engagement formations and high friction coatings have been illustrated as being applied to bushes, in other embodiments bushes can be omitted and the engagement formations or coating can applied directly to the lugs.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly comprising:
a first part and a second part, the first and second parts being movably mounted with respect to one another;
a structural member pivotally coupled to the first part via a first joint, the structural member having a load reacting condition in which it inhibits relative movement between the first and second parts by reacting to a compressive load applied to it by the parts,
the first joint including a first bearing surface associated with the first part and a second bearing surface associated with the structural member, the first joint being arranged such that the first bearing surface mechanically couples with the second bearing surface during said compressive loading so as to define a load path between the first and second bearing surfaces by each bearing surface engaging a respective bearing counter-face; and
one or more springs,
wherein the first and second bearing surfaces each define male and/or female engagement formations arranged to engage with the respective first and second counter-faces to inhibit pivotal movement of the structural member relative to the first part when the first and second bearing surfaces are engaged in an interlocking condition with the respective first and second counter-faces, the one or more springs being arranged to urge the first and second bearing surfaces to assume a spaced condition in which they are relatively spaced from the respective first and second counter-faces so as to permit said pivotal movement of the structural member relative to the first part.

2. The landing gear assembly according to claim 1, wherein the structural member is pivotally coupled to the second part via a second joint and the second joint includes a third bearing surface associated with the second part and a fourth bearing surface associated with the structural member, the second joint being arranged such that the third bearing surface mechanically couples with the fourth bearing surface during said compressive loading by each engaging with a bearing counter-face,
wherein the third and fourth bearing surfaces each define male and/or female engagement formations arranged to engage with the respective third and fourth counter-faces to inhibit pivotal movement of the structural member relative to the second part when the third and fourth bearing surfaces are engaged in an interlocking condition with the respective third and fourth counter-faces, the assembly further comprising one or more resilient biasing members arranged to urge the third and fourth bearing surfaces to assume a spaced condition in which they are relatively spaced from the respective third and fourth counter-faces so as to permit said pivotal movement of the structural member relative to the second part.

3. The landing gear assembly according to claim 1, wherein the structural member comprises a two bar linkage pivotally coupled at a central region between its ends by a third joint, the third joint including a fifth bearing surface associated with a first bar of the structural member and a sixth bearing surface associated with a second bar of the structural member, the third joint being arranged such that the fifth bearing surface mechanically couples with the sixth bearing surface during said compressive loading by each engaging with a bearing counter-face,
wherein the fifth and sixth bearing surfaces each define male and/or female engagement formations arranged to engage with the respective fifth and sixth counter-faces to inhibit pivotal movement of the first bar of the structural member relative to the second bar of the structural member when the fifth and sixth bearing surfaces are engaged in an interlocking condition with the respective fifth and sixth counter-faces, the assembly further comprising one or more resilient biasing members arranged to urge the fifth and sixth bearing surfaces to assume a spaced condition in which they are relatively spaced from the respective fifth and sixth counter-faces so as to permit said pivotal movement of the first bar of the structural member relative to the second bar of the structural member.

4. The landing gear assembly according to claim 1, wherein the engagement formations of the bearing surfaces and the counter-faces are provided only at the regions which engage during compressive loading of the structural member.

5. An aircraft landing gear assembly comprising:
a first part and a second part, the first and second parts being movably mounted with respect to one another; and
a structural member pivotally coupled to the first part via a first joint, the structural member having a load reacting condition in which it inhibits relative movement between the first and second parts by reacting to a compressive load applied to it by the parts, the first joint including a first bearing surface associated with the first part and a second bearing surface associated with the structural member, the joint being arranged such that the first bearing surface mechanically couples with the second bearing surface during said compressive loading so as to define a load path between the first and second bearing surfaces by each bearing surface engaging a respective bearing counter-face, wherein at least one of the first bearing surface and the first counter-face and at least one of the second bearing surface and the second counter-face is defined by a layer of first material having a coefficient of friction which is relatively high in comparison to that of a second material from which at least one of the structural member, the first part and the second part is formed.

6. The aircraft landing gear assembly according to claim 5, wherein the structural member is pivotally coupled to the second part via a second joint and the second joint includes a third bearing surface associated with the second part and a fourth bearing surface associated with the structural member, the second joint being arranged such that the third bearing surface mechanically couples with the fourth bearing surface during said compressive loading by each engaging with a bearing counter-face, wherein at least one of the third bearing surface and the third counter-face and at least one of the fourth bearing surface and the fourth counter-face is defined by a layer of third material having a coefficient of friction which is relatively high in comparison to that of the second material from which at least one of the structural member, the first part and the second part is formed.

7. The aircraft landing gear assembly according to claim 5, wherein the structural member comprises a two bar linkage pivotally coupled at a central region between its ends by a third joint, the third joint including a fifth bearing surface associated with a first bar of the structural member and a sixth bearing surface associated with a second bar of the structural member, the third joint being arranged such that the fifth bearing surface mechanically couples with the sixth bearing surface during said compressive loading by each engaging with a bearing counter-face, wherein at least one of the fifth bearing surface and the fifth counter-face and at least one of the sixth bearing surface and the sixth counter-face is defined by a layer of first material having a coefficient of friction which is relatively high in comparison to that of the second material from which at least one of the structural member, the first part and the second part is formed.

8. The aircraft landing gear assembly according to claim 5, wherein one or more of the high coefficient of friction layers comprise a coating applied to the part in question.

9. The aircraft landing gear assembly according to claim 5, wherein one or more of the high coefficient of friction layers are defined on a bush which defines one of the bearing surfaces.

10. The aircraft landing gear assembly according to claim 5, wherein one or more springs are provided and arranged to urge the first and second bearing surfaces to assume a spaced condition in which they are relatively spaced from the respective first and second counter-faces so as to enable relatively unrestricted pivotal movement of the structural member relative to the first part in comparison when the first bearing surface mechanically couples with the second bearing surface during said compressive loading.

11. The aircraft landing gear assembly according to claim 1, wherein each spring comprises a generally annular, radially compliant spring disposed between a pair of smooth race surfaces, each race surface being arranged in parallel with a respective bearing surface or counter-face and at least one race within each pair being recessed with respect to the respective bearing surface or counter-face it such that a gap exists to house the deformed spring when the bearing surfaces engage the counter-faces.

12. The aircraft landing gear assembly according to claim 1, wherein the first bearing surface is defined by an inner generally cylindrical face of a hole formed through each of one or more parallel first lugs associated with the first part, the second bearing surface is defined by an inner generally cylindrical face of a hole formed through each of one or more parallel second lugs associated with the structural member, and the first and second counter-faces are defined by a pivot pin mounted within the coaxial holes defined by the first and second lugs.

13. The aircraft landing gear assembly according to claim 2, wherein the third bearing surface is defined by an inner generally cylindrical face of a hole formed through each of one or more parallel third lugs associated with the second part, the fourth bearing surface is defined by an inner generally cylindrical face of a hole formed through each of one or more faces are defined by a pivot pin mounted within the coaxial holes defined by the third and fourth lugs.

14. The aircraft landing gear assembly according to claim 3, wherein the fifth bearing surface is defined by an inner generally cylindrical face of a hole formed through each of one or more parallel fifth lugs associated with the first bar of the structural member, the sixth bearing surface is defined by an inner generally cylindrical face of a hole formed through each of one or more parallel sixth lugs associated with the second bar of the structural member and the fifth and sixth counter-faces is defined by a third pivot pin mounted within the coaxial holes defined by the fifth and sixth lugs.

15. The aircraft landing gear assembly according to claim 1, wherein the first part comprises a main strut and the second part comprises the airframe of an aircraft or a stay arm.

16. The aircraft landing gear assembly according to claim 5, wherein each spring comprises a generally annular, radially compliant spring disposed between a pair of smooth race surfaces, each race surface being arranged in parallel with a respective bearing surface or counter-face and at least one race within each pair being recessed with respect to the respective bearing surface or counter-face it such that a gap exists to house the deformed spring when the bearing surfaces engage the counter-faces.

17. The aircraft landing gear assembly according to claim 5, wherein the first bearing surface is defined by an inner generally cylindrical face of a hole formed through each of one or more parallel first lugs associated with the first part, the second bearing surface is defined by an inner generally cylindrical face of a hole formed through each of one or more parallel second lugs associated with the structural member, and the first and second counter-faces are defined by a pivot pin mounted within the coaxial holes defined by the first and second lugs.

18. The aircraft landing gear assembly according to claim 6, wherein the third bearing surface is defined by an inner generally cylindrical face of a hole formed through each of one or more parallel third lugs associated with the second part, the fourth bearing surface is defined by an inner generally cylindrical face of a hole formed through each of one or more parallel fourth lugs associated with the structural member and the third and fourth counter-faces are defined by a pivot pin mounted within the coaxial holes defined by the third and fourth lugs.

19. The aircraft landing gear assembly according to claim 7, wherein the fifth bearing surface is defined by an inner generally cylindrical face of a hole formed through each of one or more parallel fifth lugs associated with the first bar of the structural member, the sixth bearing surface is defined by an inner generally cylindrical face of a hole formed through each of one or more parallel sixth lugs associated with the second bar of the structural member and the fifth and sixth counter-faces are defined by a third pivot pin mounted within the coaxial holes defined by the fifth and sixth lugs.

20. The aircraft landing gear assembly according to claim 5, wherein the first part comprises a main strut and the second part comprises the airframe of an aircraft or a stay arm.

* * * * *